(12) United States Patent
Wingett et al.

(10) Patent No.: US 7,077,072 B2
(45) Date of Patent: Jul. 18, 2006

(54) UNMANNED UNDERWATER VEHICLE TURBINE POWERED CHARGING SYSTEM AND METHOD

(75) Inventors: Paul T. Wingett, Mesa, AZ (US); Sharon K. Brault, Chandler, AZ (US); Calvin C. Potter, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 215 days.

(21) Appl. No.: 10/822,017

(22) Filed: Apr. 8, 2004

(65) Prior Publication Data

US 2006/0054074 A1    Mar. 16, 2006

Related U.S. Application Data

(60) Provisional application No. 60/529,345, filed on Dec. 11, 2003.

(51) Int. Cl.
*B63G 8/00* (2006.01)

(52) U.S. Cl. ........................ 114/312; 114/322

(58) Field of Classification Search ................ 114/312, 114/322, 258, 259, 230.1; 405/188
See application file for complete search history.

(56) References Cited

U.S. PATENT DOCUMENTS

| | | | |
|---|---|---|---|
| 4,087,975 A | 5/1978 | Owens | |
| 4,159,427 A | 6/1979 | Wiedemann | |
| 4,189,647 A | 2/1980 | Wittig | |
| 4,276,122 A | 6/1981 | Snyder | |
| 4,340,812 A | 7/1982 | Mori | |
| 4,553,037 A | 11/1985 | Veazey | |
| 4,764,313 A | 8/1988 | Cameron et al. | |
| 4,768,984 A | 9/1988 | de Oliveira et al. | |
| 5,449,307 A | 9/1995 | Fuereder | |
| 5,451,137 A | 9/1995 | Gorlov | |
| 5,642,984 A | 7/1997 | Gorlov | |
| 5,798,572 A | 8/1998 | Lehoczky | |
| 5,946,909 A | 9/1999 | Szpur | |
| 6,036,443 A * | 3/2000 | Gorlov ........................ 416/176 |
| 6,091,161 A | 7/2000 | Dehlsen et al. | |
| 6,104,097 A | 8/2000 | Lehoczky | |
| 6,807,921 B1 * | 10/2004 | Huntsman .................... 114/312 |
| 6,854,410 B1 * | 2/2005 | King et al. ................. 114/244 |
| 2002/0197148 A1 | 12/2002 | Belinsky | |
| 2003/0167998 A1 * | 9/2003 | Huntsman .................... 114/312 |
| 2005/0149236 A1 * | 7/2005 | Potter et al. ................... 701/21 |
| 2005/0279270 A1 * | 12/2005 | Wingett et al. ............. 114/312 |

* cited by examiner

*Primary Examiner*—Sherman Basinger
(74) *Attorney, Agent, or Firm*—Ingrassia Fisher & Lorenz

(57) ABSTRACT

A charging system for an unmanned underwater vehicle (UUV) is disposed within a submerged docking station. The charging system includes a battery, one or more generators, and a charge controller. The battery supplies electrical power to an electrical distribution bus in the docking station. The charge controller monitors the charge state of the battery and, when needed, activates one or more of the generators to recharge the battery. The charge controller also activates one or more of the generators when a UUV is docked in the docking station for recharging of its power plant.

32 Claims, 3 Drawing Sheets

UNMANNED UNDERWATER VEHICLE TURBINE POWERED CHARGING SYSTEM AND METHOD

CROSS-REFERENCES TO RELATED APPLICATIONS

This application claims the benefit of U.S. Provisional Application No. 60/529,345, filed Dec. 11, 2003.

FIELD OF THE INVENTION

The present invention relates to unmanned underwater vehicles and, more particularly, to an unmanned underwater vehicle turbine powered charging system and method.

BACKGROUND OF THE INVENTION

Unmanned underwater vehicles (UUVs) may be used to conduct various military and non-military operations. Such operations may include, for example, maritime reconnaissance, undersea searching, undersea surveying, submarine tracking and trailing, monitoring of various types of sea traffic, monitoring animal and plant life, and communication and/or navigational aids. These and other operational capabilities make UUVs a potential option in providing a sea-going component for homeland security. In a homeland security scenario, multiple UUVs could be deployed along the coasts of the country, and conduct various security-related monitoring and surveillance operations.

For most military and homeland security operations, it may be desirable that the UUVs remain submerged for relatively long periods of time. As such, many UUVs may include a propulsion plant that is powered by a power source that can generate a desired level of power while the UUV remains submerged, while at the same time generating a relatively low level of acoustic noise. Various types of power sources have been used and/or developed that meet one or more of these objectives. Some examples include batteries, and closed brayton cycles (CBCs) with rechargeable heat sources. Although batteries and rechargeable heat sources may be advantageous from a cost standpoint, both of these types of power sources may need periodic recharging.

In addition to the need to be periodically recharged or refueled, at some point during UUV operation, it may be desirable to retrieve various types of data from, and to supply various types of data to, the UUV. Such data can include stored intelligence data, data associated with equipment on-board the UUV, and data that updates UUV mission programming.

In many current UUVs, the need to periodically recharge, and/or retrieve data from, and/or supply data to, the UUV may require that the UUV be periodically retrieved, and taken out of service. In many instances, this results in the UUV being surfaced, and removed from the water, in order to conduct these operations. Moreover, some current UUVs may be periodically taken out of service to inspect on-board equipment to determine if maintenance should be conducted. In both instances, this can be a costly and time-consuming operation, and can reduce overall mission effectiveness.

Hence, there is a need for a system and method that will recharge a UUV, and/or retrieve data from, and/or supply data to, a UUV without having to surface the UUV and remove it from the water. The present invention addresses one or more of these needs.

SUMMARY OF THE INVENTION

The present invention provides a system and method for recharging a UUV, without having to surface the UUV and remove it from the water. The system and method also enable retrieving data from, and/or supplying data to, a UUV without having to surface the UUV and remove it from the water.

In one embodiment, and by way of example only, a charging system for an unmanned underwater vehicle includes an electrical port, a battery, a fluid-powered turbine, a generator, and a controller. The electrical port is adapted to electrically couple to an unmanned underwater vehicle (UUV). The fluid-powered turbine is adapted to receive a flow of fluid and is configured, upon receipt thereof, to rotate. The generator is coupled to the turbine and is configured, upon rotation thereof, to generate electrical power. The controller is adapted to receive a UUV docking signal that indicates at least that the electrical port is electrically coupled to the UUV and operable, in response thereto, to selectively electrically couple the generator to the electrical port.

In yet another exemplary embodiment, a docking station for an unmanned underwater vehicle (UUV) includes a housing, a UUV docking port, an electrical port, a battery, a fluid-powered turbine, a generator, and a controller. The UUV docking port is disposed within the housing and is configured to dock a UUV therein. The electrical port is disposed at least partially within the UUV docking port, and is adapted to electrically couple to a docked UUV. The fluid-powered turbine is adapted to receive a flow of fluid and is configured, upon receipt thereof, to rotate. The generator is coupled to the turbine and is configured, upon rotation thereof, to generate electrical power. The controller is adapted to receive a UUV docking signal that indicates at least that the electrical port is electrically coupled to the UUV and operable, in response thereto, to selectively electrically couple the generator to the electrical port.

In yet another exemplary embodiment, a method of charging a power source for an unmanned underwater vehicle (UUV) includes electrically coupling an electrical port to the at least a portion of the UUV power source. An electrical generator is activated, and is electrically coupled to the electrical port, to thereby charge the UUV power source using at least the UUV power source.

Other independent features and advantages of the preferred UUV charging system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
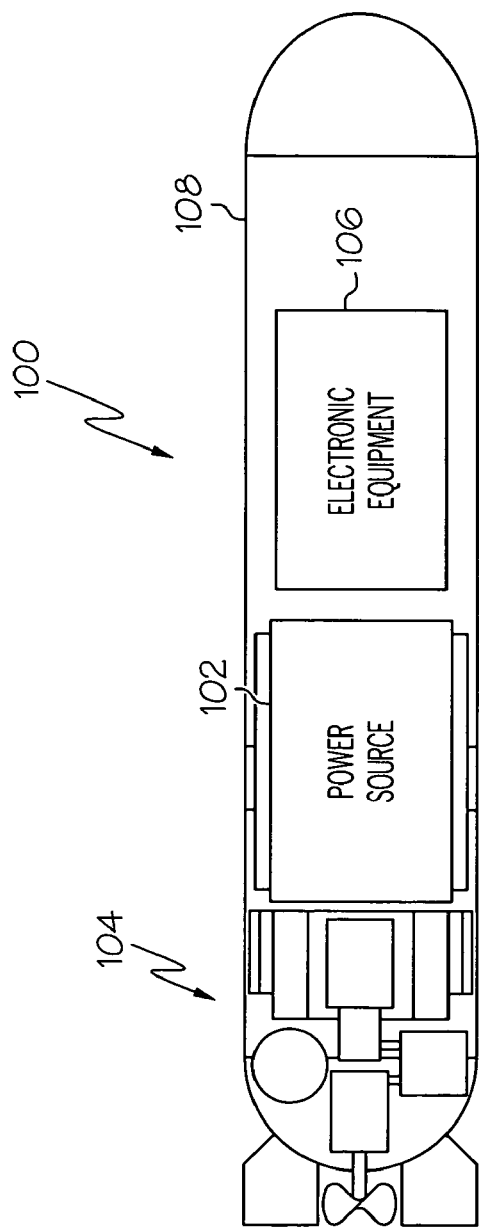
FIG. 1 is a simplified functional block diagram representation of an exemplary unmanned underwater vehicle (UUV)

The following detailed description of the invention is merely exemplary in nature and is not intended to limit the invention or the application and uses of the invention. Furthermore, there is no intention to be bound by any theory presented in the preceding background of the invention or the following detailed description of the invention An exemplary embodiment of an unmanned underwater vehicle (UUV) 100 is shown in FIG. 1, and includes a power source 102, a power plant 104, and on-board electronic equipment 106, all housed within a hull 108. The power source 102 is a rechargeable power source and is used to supply power to the power plant 104. The power source 102 may be any one of numerous types of rechargeable power sources such as, for example, a rechargeable heat source for driving a closed Brayton cycle (CBC), and/or a battery. If a rechargeable heat source is used, it may be any one of numerous types of rechargeable heat sources such as, for example, a porous solid or a molten salt. Similarly, if a battery is used, it may be any one of numerous types of rechargeable batteries such as, for example, a lead-acid battery, a nickel-cadmium battery, or a lithium battery.

The power plant 104 uses the power supplied from the power source 102 to generate propulsion power and electrical power for the UUV 100. Thus, the power plant 104 preferably includes one or more turbines, generators, and/or motors to supply the needed propulsion and electrical power. It will be appreciated that the particular number, type, and configuration of equipment and components used to implement the propulsion plant 104 may vary depending on the specific power source 102 that is used.

The on-board electronic equipment 106 may also vary, depending on the purpose and mission of the UUV 100, the configuration of the power source 102, and/or the configuration of the power plant 104. No matter the particular type of on-board electronic equipment 106 that is used, or its particular configuration, the on-board electronic equipment 106 is preferably configured to gather and store data regarding various equipment and systems on-board the UUV 100, including the power source 102 and power plant 104, as well as data associated with the mission of the UUV 100. The on-board electronic equipment 106 is also preferably configured to transmit some or all of the data it gathers and stores to, and/or to receive various types of data from, a remote station (not illustrated).

Figure 2:
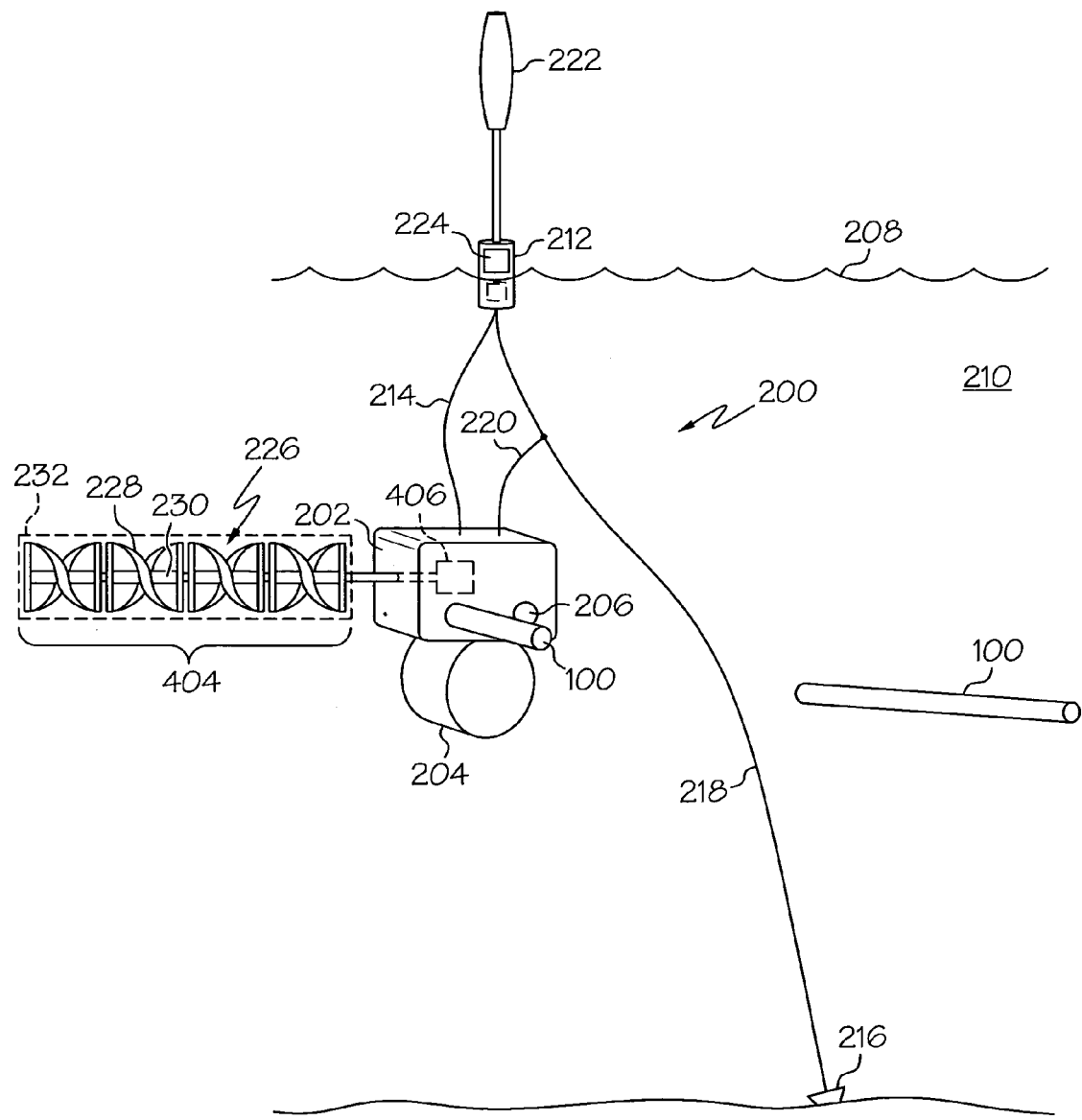
FIG. 2 is a simplified perspective view of an exemplary UUV docking station that may be used to dock one or more UUVs, such as the exemplary UUV shown in FIG. 1.

The UUV power source 102 can be recharged, and data can be transferred to/from the on-board electronic equipment 106, whenever the UUV 100 is docked in a docking station. An exemplary embodiment of a docking station 200 is illustrated in FIG. 2, and includes a housing 202, one or more buoyancy tanks 204, and one or more docking ports 206. When deployed, the docking station 200 is preferably submerged below the surface 208 of the body of water 210 in which it is placed, and is tethered to a surface buoy 212 via a tether line 214. The tether line 214 may be any one of numerous types of tether lines 214 that preferably include one or more sets of conductors for transmitting data between the surface buoy 212 and the docking station 200, and may additionally include one or more conduits that may be used to supply air and/or fuel to the docking station 200. The position of the surface buoy 212 is maintained using an anchor 216 that is coupled to the surface buoy 212 via an anchor line 218. An additional length of anchor line 220 may also be coupled between the docking station 200 and the surface buoy anchor line 218.

The surface buoy 212 may be an existing surface buoy 212 or may be specifically designed to interface with the docking station 200. In either case, the surface buoy 212 preferably includes one or more antennae 222 for transmitting data to and receiving data from the previously-mentioned remote station. The surface buoy 212 also preferably includes one or more transceivers 224 configured to transmit data to and receive data from the non-illustrated remote station. The transceivers 224, or separate transceivers, are also preferably configured to transmit data to and receive data from the on-board electronic equipment 106 in a docked UUV 100.

The buoyancy tank 204 is coupled to the docking station housing 202 and, in the depicted embodiment, is disposed external to the housing 202. It will be appreciated that the docking station 200 could include more than one buoyancy tank 204, and that the one or more buoyancy tanks 204 could be disposed either within or external to the housing 202. Moreover, as will be described in more detail further below, the buoyancy tank 204 may also be configured as a storage tank for fuel that is used by one or more devices housed within the docking station housing 202.

The docking ports 206 are disposed within the docking station housing 202 and are each configured to receive, and dock, a single UUV 100 therein. In the depicted embodiment, the housing 202 is configured to include two docking ports 206; however, it will be appreciated that this is merely exemplary, and that the housing 202 could be configured to include more or less than this number of docking ports 206. Moreover, although the docking ports 206 are shown as being configured to receive and dock a single UUV 100 therein, it will be appreciated that one or more of the docking ports 206 could be configured to receive and dock more than one UUV 100. It will be appreciated that the surface buoy 212 also preferably includes one or more air and/or fuel connections, which are used to service the submerged docking station 200.

Figure 3:
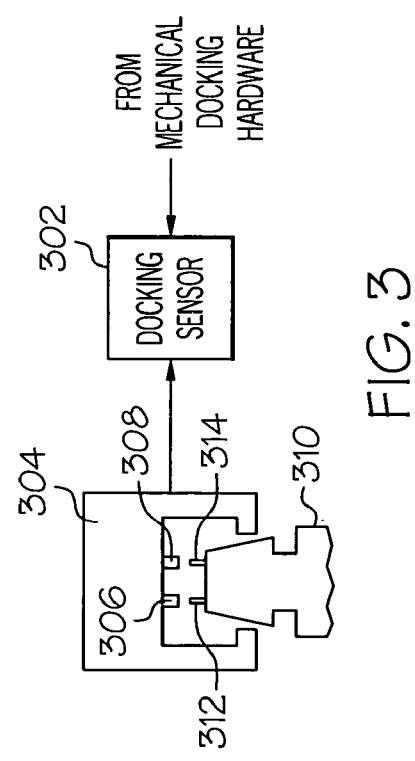
FIG. 3 is a simplified schematic representation illustrating exemplary mechanical and electrical interconnections between the UUV docking station and a UUV.

No matter the particular number of docking ports 206, or the particular number of UUVs 100 each docking port 206 can receive and dock, it will be appreciated that each docking port 206 includes hardware sufficient to mechanically capture a UUV 100, and to electrically couple to portions of the UUV 100. A simplified representation of a portion of this hardware 300 is shown in FIG. 3, and includes a docking sensor 302, and a docking connector 304. The docking sensor 302 is configured to sense when the UUV 100 is properly docked in the docking port 206 and is ready to be recharged. As will be described more fully below, the docking sensor 302 supplies an appropriate sensor signal to equipment within the docking station 200 indicating that the UUV 100 is properly docked, both mechanically and electrically.

Figure 4:
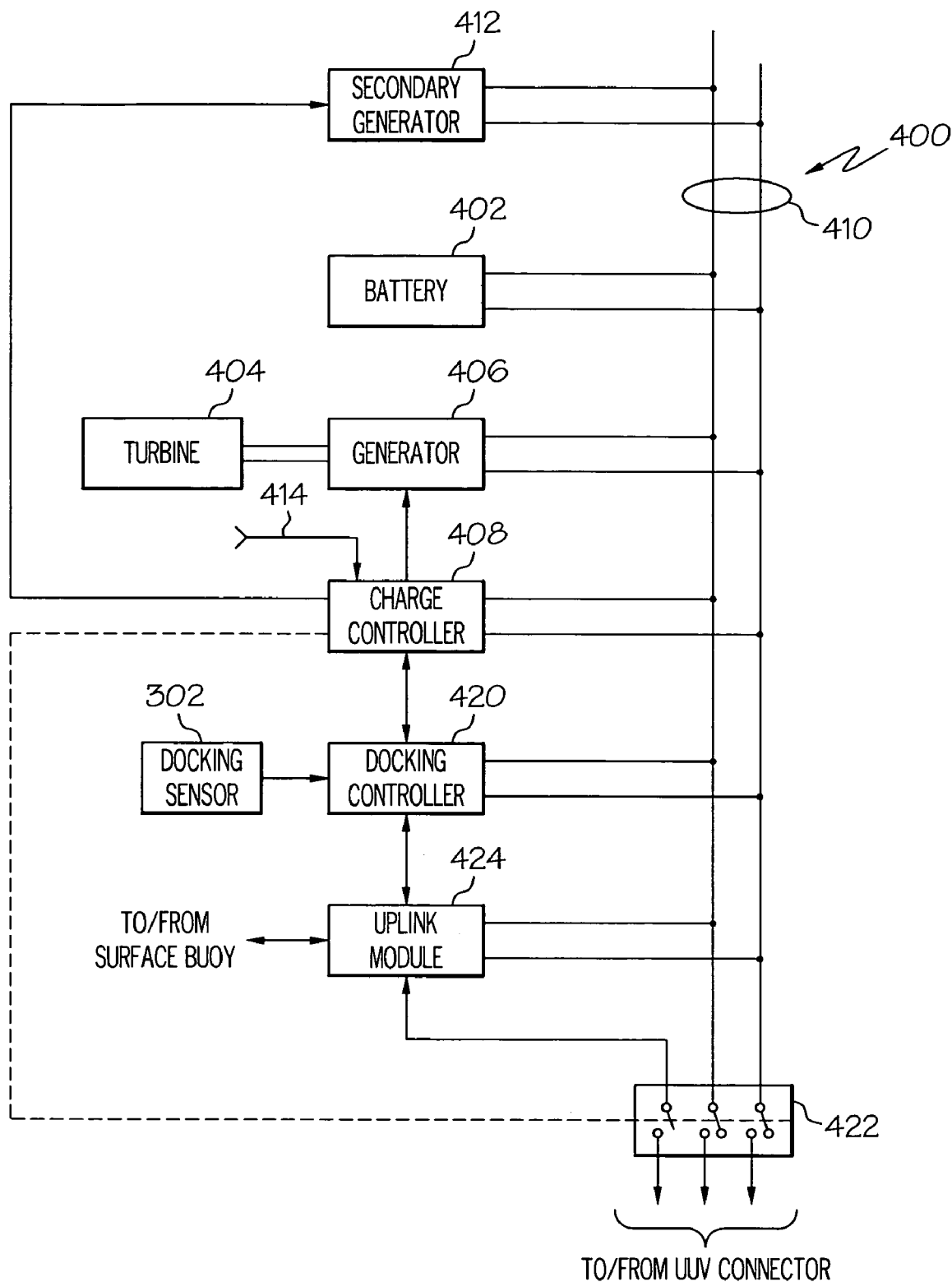
FIG. 4 is a functional block diagram of an exemplary charging system that may be used to recharge a UUV while docked in the UUV docking station of FIG. 1.

The docking connector 304 includes data port 306 and a power port 308. When the UUV 100 is properly docked within a docking port 206, the docking connector 304 is couple to a UUV connector 310, which also includes a data port 312 and a power port 314. The docking connector data port 306 and UUV connector data port 312 are configured to electrically couple together, as are the docking connector power port 308 and the UUV connector power port 314. The data connector ports 306, 312 are used to transmit data from, and/or supply data to, the on-board electronic equipment 106, and the power ports 308, 314 are used to supply electrical power to recharge the power source 102. It will be appreciated that if the power source 102 is a rechargeable heat source, the electrical power is supplied to one or more induction heater coils (not illustrated) to reheat (e.g., recharge) the heat source. The electrical power that is used to recharge the UUV power source 102 is supplied from a charging system that preferably forms part of the docking station 200. A functional block diagram of the charging system is shown in FIG. 4, and will now be described.

The charging system 400 includes a battery 402, one or more turbines 404, a generator 406, and a charge controller 408. The battery 402 may be sized, and include a desired number of cells, to supply a desired voltage and current magnitude, and may be implemented as any one of numerous types of rechargeable batteries such as, for example, the battery types previously mentioned. The battery 402 is coupled to a power distribution bus 410, which is used to distribute electrical power to the charge controller 408 and various other electrical and electronic equipment on or within the docking station 200. As will be described more fully below, the battery 402 supplies electrical power to the power distribution bus 410 whenever the generator 406 is not being used to supply electrical power.

The turbine 404 is a fluid-powered turbine that is configured to convert the flow energy of a working fluid into rotational mechanical energy. As will be discussed further below, the rotational mechanical energy is in turn converted into electrical energy. To implement its functionality, the turbine 404 is adapted to receive a flow of working fluid and is configured, upon receipt thereof, to rotate. The working fluid for the turbine 404 comes from the body of water 210 in which the docking station 200 is placed. It will be appreciated that the flow energy of the working fluid that is used to drive the turbine 404 may be the flow energy that is inherent in the working fluid, or the flow energy may be increased via a pump or other device before the working fluid is supplied to the turbine 404. Preferably, however, the turbine 404 relies solely on the inherent flow energy in the working fluid.

The turbine 404 may be any one of numerous types of fluid-powered turbines. It will additionally be appreciated that the turbine 404, depending on its particular type, may be disposed either within, or external to, the docking station 200. Non-limiting examples of the types of turbines that could be used to implement the turbine 404 include, but are not limited to, a Darrieus turbine, a Wells turbine, or a McCormick turbine. In a particular preferred embodiment, the turbine 404 is implemented as one or more Gorlov turbines that are disposed external to the docking station 200. An exemplary embodiment of a plurality of Gorlov turbines 226 is shown more clearly in FIG. 2 and, with momentary reference back to FIG. 2, will now be discussed in more detail.

As is generally known, a Gorlov turbine 226 includes a plurality of helical blades 228 that are coupled to a rotationally mounted shaft 230, and may be disposed freely in the water 210 or disposed within a housing 232. In a preferred embodiment, the Gorlov turbine 226 is disposed freely in the water 210, and thus the housing 232 is shown in phantom in FIG. 2. The helical configuration of the blades 228 ensures that at least part of each blade 228 is aligned with the water flow to and through the turbine 226, which provides increased energy conversion efficiency relative to various other known turbines. It will additionally be appreciated that the Gorlov turbine 226 can be configured to rotate in a single direction no matter the direction of water flow through the turbine 226. As a result, the Gorlov turbine 226 can be disposed within the water 210, and used to convert flow energy to rotational mechanical energy no matter what direction the water 210 may be flowing through the turbine 226.

The rotational mechanical energy generated by the Gorlov turbine 226 is converted to electrical energy by the generator 406. To do so, the turbine 226 is coupled, via the shaft 230, to the generator 406. The generator 406 converts the rotational mechanical energy of the turbine 404 to electrical energy. More specifically, and returning once again to FIG. 4, it is seen that the generator 406 is electrically coupled to the power distribution bus 410, and is used to generate electrical power to both recharge the docking station battery 402, and to recharge the UUV power plant 102. The generator 406 may be any one of numerous types of generators including, but not limited to a brushless AC generator or a brushed DC generator, but in a particular preferred embodiment it is a brushless DC generator. With quick reference back to FIG. 2, it is seen that the primary generator 406 is preferably disposed within the docking station 200. It will be appreciated, however, that the generator 406 could instead be disposed external to the docking station 200, and electrically coupled to the power distribution bus 410 via suitable conductors (not illustrated).

The charge controller 408 controls the overall operation of the charging system 400. In the depicted embodiment, the charging station controller 408 controls the charging system 400 to operate in two separate modes, depending upon whether a UUV 100 is, or is not, docked and charging. In the first mode, referred to herein as the "dormant mode," the charging system 400 is not used to charge a UUV 100. In the dormant mode, the battery 402 is used to supply electrical power to the power distribution bus 410. The charge controller 408 monitors the state of charge of the battery 402, and when it drops to a predetermined charge state, the charge controller 408 initiates a recharge of the battery 402. In the depicted embodiment, the charge controller 408 is electrically coupled to the power distribution bus 410, and monitors battery charge state by monitoring battery voltage, on the basis of power distribution bus voltage. It will be appreciated, however, that the charging station controller 408 could monitor and determine battery charge state in any one of numerous other ways.

To initiate a recharge of the battery 402, the charging station controller 408 supplies an appropriate activation command to the generator 406. In response, the generator 406 is activated and begins generating electrical power. This electrical power is used to recharge the battery 402, via the power distribution bus 410. When the battery 402 is recharged, the charging station controller 408 then supplies an appropriate deactivation command to the generator 406, which deactivates the generator 406. The battery 402 then resumes its function of supplying electrical power to the power distribution bus 410.

The second mode that the charging station controller 408 operates in is referred to herein as the "docking mode." In the docking mode, the charging system 400 is used to charge/recharge a UUV 100, via the docking connector 304. More specifically, the docking connector power port 308 receives electrical power from the power distribution bus 410, via a charge control switch 422 that is electrically coupled between the power distribution bus 410 and the docking connector power port 308. The position of the charge control switch 422 is controlled by the charging station controller 408.

To initiate a recharge of a UUV 100, the UUV 100 is first properly docked in one of the docking ports 206. When the UUV 100 is properly docked, and the docking connector 304 is coupled to the UUV connector 310, the docking sensor 302, as was noted above, issues an appropriate signal. In the depicted embodiment, this signal is supplied to a docking controller 420, which in turn supplies a signal to the charging station controller 408. It will be appreciated, however, that the functions of the docking controller 420 could be implemented in the charging station controller 408, and vice-versa. In any case, the charging station controller 408, upon receiving the signal indication that the UUV 100 is properly docked, supplies an appropriate activation command to the generator 406, which causes generator 406 to begin generating electrical power. The charging station controller 408 also supplies an appropriate switch position command signal to the charge control switch 422, which causes the charge control switch to shut and electrically couple the power distribution bus 410 to the docking connector power port 308. As a result, the electrical power generated by the generator 406 is supplied to the UUV 100, to recharge the UUV power source 102.

The generator 406 remains activated at least until the UUV power source 102 is recharged, the UUV 100 is released from the docking port 206, and the battery 402 is fully charged. Once this occurs, the charging station controller 408 supplies an appropriate deactivation command to the generator 406, and an appropriate switch position control signal to the charge control switch 422. In response to these signals, the generator 406 is deactivated, and the charge control switch 422 is moved to its open position to electrically decouple the power distribution bus 410 from the docking connector power port 308. It will be appreciated that in some instances, the UUV 100 may be released from the docking port 206 before the battery 402 is fully charged. In such an instance, the charge control switch 422 may be moved to the open position before the generator 406 is deactivated.

It was previously noted that the UUV power source 102 could be any one of numerous types of rechargeable power sources. It will be appreciated that the manner in which the charging system 400 recharges the UUV power source 102 may differ for differing types of rechargeable power sources 102. Thus, the charge controller 408 may additionally receive a signal representative of the type of power source 102 that is going to be recharged. This signal may be supplied directly to the charge controller 408, or may be supplied to the charge controller 408 via the docking controller 420.

As FIG. 4 additionally shows, an electronic uplink module 424 may also be included in the docking station 200. The uplink module 424 is used to retrieve data from, and transfer data to, the UUV 100, via the docking and UUV data connector ports 306, 312, and transfer the retrieved data to the one or more transceivers 224 in the surface buoy 212, or to directly transmit the data to a remote station via the antenna 222. When the uplink module 424 is included, the charging system 400 is preferably operated in the docking mode until the UUV power source 102 is recharged, the UUV 100 is released from the docking port 206, the uplink module 424 completes its data transfers to and/or from the UUV 100, and the battery 402 is fully charged.

At times, the body of water 210 in which the docking station 200 is deployed, or at least the water 210 in the area around and in which the docking station is deployed, may be in such a state that its flow energy is not sufficiently high to generate a desired amount of power, or to generate any power at all. For example, a calm sea state may not have sufficient energy to rotate the turbine 404 at all, or at least at a desired speed. If the water 210 remains in such a state for an extended period of time, the battery 402 could become depleted, and/or the docking station 200 may not be able to recharge one or more UUVs 100. Thus, as is additionally shown in FIG. 4, the charging system 400 may additionally include a secondary generator 412.

The secondary generator 412, if included, is preferably used to supplement the electrical function of the generator 406, which is referred to hereafter as the primary generator. For example, if the state of the water 210 is such that the turbine 404 is unable to rotate the primary generator 406 as a speed to generate sufficient electrical power, the secondary generator 412 can instead be used to recharge the battery 402, and/or recharge a power plant 102 in a docked UUV 100. To implement this functionality, the charge controller 408 is preferably configured to receive a signal 414 representative of the power delivery capability of the turbine 404 and/or primary generator 406. This signal can be supplied from, for example, a sensor configured to sense the state of the water 210, a sensor configured to sense the rotational speed of the turbine 404, a sensor configured to sense the electrical power output of the primary generator 406, or a combination of two or more of these sensors. No matter the specific source of the power capability signal 414, the charge controller 408, in response to this signal 414, will selectively activate and/or electrically couple and decouple the secondary generator 412 to and from the power distribution bus 410, respectively, for use in place of the primary generator 406.

The secondary generator 412 may be any one of numerous types of generators including, but not limited to, an engine driven generator, a fuel cell, or a solar powered generator. If the secondary generator 412 is engine driven, or is a fuel cell, it will be appreciated that one or more of the docking station buoyancy tanks 204 may be used to store fuel for the engine. Moreover, the charge controller 408, in such instances, is preferably configured to selectively activate the secondary generator 412 by, among other things, selectively supplying fuel thereto and, in the case of an engine driven generator, to control the startup and operation of the engine.

If the secondary generator 412 is a solar powered generator, it may include one or more solar panels that are coupled to the surface buoy 212 above the surface 208 of the water 210, to thereby collect solar energy and convert it to electrical energy. The electrical energy generated by the solar panels is then supplied to the docking station 200 via electrical conductors in the tether line 214. In this latter instance, the charge controller 408 is preferably configured to selectively couple and decouple the secondary generator 412 to the power distribution bus 410 via, for example, a non-illustrated switch.

It will be appreciated that the charging system 400 is described herein as being installed at least partially in the docking station 200. It will be appreciated, however, that in an alternative embodiment the charging system 400 may be at least partially installed in the surface buoy 212. In this embodiment, the electrical power the charging system 400 generates is supplied to the UUV 100 via the tether line 214.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A charging system for an unmanned underwater vehicle, comprising:
   an electrical port adapted to electrically couple to an unmanned underwater vehicle (UUV);
   a fluid-powered turbine adapted to receive a flow of fluid and configured, upon receipt thereof, to rotate;
   a generator coupled to the turbine and configured, upon rotation thereof, to generate electrical power;
   a battery; and
   a controller adapted to receive a UUV docking signal that indicates at least that the electrical port is electrically coupled to the UUV and one or more signals representative of at least a state of charge of the battery, the controller operable, in response to the UUV docking signal, to selectively electrically couple the generator to the electrical port, and further operable, in response to the one or more signals representative of at least a state of charge of the battery, to selectively electrically couple the generator to the battery, to thereby recharge the battery to a predetermined state of charge.

2. The system of claim 1, wherein the controller is further responsive to the UUV docking signal to selectively activate and deactivate the generator, whereby the generator generates electrical power and does not generate electrical power, respectively.

3. The system of claim 1, wherein the fluid-powered turbine comprises a Gorlov turbine.

4. The system of claim 1, further comprising:
   a data transfer module adapted to receive data from the UUV and transfer the received data to data receptor.

5. The system of claim 4, wherein the data transfer module is electrically coupled to receive power from either, or both, the battery or generator.

6. The system of claim 1, further comprising:
   a UUV docking control module adapted to receive a signal representative of the docking status of the UUV and operable, in response thereto, to supply the UUV docking signal.

7. The system of claim 6, wherein the UUV docking control module is electrically coupled to receive power from either, or both, the battery or the generator.

8. The system of claim 1, further comprising:
   a secondary generator configured to at least selectively generate electrical power.

9. The system of claim 8, wherein:
   the secondary generator is further configured to selectively generate electrical power; and
   wherein the controller is further adapted to receive one or more signals representative of a power delivery capability of the turbine and is further operable, in response thereto, to selectively activate the secondary generator and selectively electrically couple the secondary generator to the battery.

10. The system of claim 8, wherein the controller is further adapted to receive one or more signals representative of a power delivery capability of the turbine and is further operable, in response thereto, to selectively electrically couple the secondary generator to the battery.

11. The charging system of claim 8, wherein the controller is further operable, in response to the UUV docking signal, to supply one or more switch command signals, and wherein the system further comprises:

a switch coupled between the electrical port and the secondary generator and moveable between an open position, in which the secondary generator is not electrically coupled to the electrical port, and a closed position, in which the secondary generator is electrically coupled to the electrical port,
wherein the switch is further coupled to receive the switch command signals and is operable, in response thereto, to selectively move between the open and closed positions.

12. The charging system of claim 1, wherein the controller is further coupled to receive a signal that indicates a type of rechargeable power source that is on-board the UUV and is further operable, in response thereto, to control a recharge operation of the rechargeable power source based at least in part on the power source type.

13. A docking station for an unmanned underwater vehicle (UUV), comprising:
   a housing;
   a UUV docking port disposed within the housing and configured to dock a UUV therein;
   an electrical port disposed at least partially within the UUV docking port, the electrical port adapted to electrically couple to a docked UUV,
   a fluid-powered turbine adapted to receive a flow of fluid and configured, upon receipt thereof, to rotate;
   a generator coupled to the turbine and configured, upon rotation thereof, to generate electrical power; and
   a controller adapted to receive a UUV docking signal that indicates at least that the electrical port is electrically coupled to the UUV and operable, in response thereto, to selectively electrically couple the generator to the electrical port and to selectively activate and deactivate the generator, whereby the generator generates electrical power and does not generate electrical power, respectively.

14. The UUV docking station of claim 13, further comprising:
   a sensor adapted to sense at least when a UUV is properly docked in the UUV docking port, and configured to supply a sensor signal representative thereof;
   a UUV docking controller coupled to receive the signal from the sensor and operable, in response thereto, to supply the UUV docking signal to the controller.

15. The UUV docking station of claim 13, further comprising:
   a sensor adapted to sense at least when a UUV is properly docked in the UUV docking port, and configured to supply a sensor signal representative thereof to the controller,
   wherein the sensor signal is the UUV docking signal.

16. The system of claim 13, further comprising:
   a battery,
   wherein the controller is further adapted to receive one or more signals representative of at least a state of charge of the battery and is further operable, in response thereto, to selectively electrically couple the generator to the battery, to thereby recharge the battery to a predetermined state of charge.

17. The system of claim 16, further comprising:
   a UUV docking control module adapted to receive a signal representative of the docking status of the UUV and operable, in response thereto, to supply the UUV docking signal.

18. The system of claim 17, wherein the UUV docking control module is electrically coupled to receive power from either, or both, the battery or the generator.

19. The system of claim 16, further comprising:
a secondary generator configured to at least selectively generate electrical power.

20. The system of claim 19, wherein:
the secondary generator is further configured to selectively generate electrical power; and
wherein the controller is further adapted to receive one or more signals representative of a power delivery capability of the turbine and is further operable, in response thereto, to selectively activate the secondary generator and selectively electrically couple the secondary generator to the battery.

21. The system of claim 19, wherein the controller is further adapted to receive one or more signals representative of a power delivery capability of the turbine and is further operable, in response thereto, to selectively electrically couple the secondary generator to the battery.

22. The charging system of claim 19, wherein the controller is further operable, in response to the UUV docking signal, to supply one or more switch command signals, and wherein the system further comprises:
a switch coupled between the electrical port and the secondary generator and moveable between an open position, in which the secondary generator is not electrically coupled to the electrical port, and a closed position, in which the secondary generator is electrically coupled to the electrical port,
wherein the switch is further coupled to receive the switch command signals and is operable, in response thereto, to selectively move between the open and closed positions.

23. The system of claim 13, wherein the fluid-powered turbine comprises a Gorlov turbine.

24. The system of claim 13, further comprising:
a data transfer module adapted to receive data from the UUV and transfer the received data to data receptor.

25. The system of claim 24, wherein the data transfer module is electrically coupled to receive power from either, or both, the battery or generator.

26. The charging system of claim 13, wherein the controller is further coupled to receive a signal that indicates a type of rechargeable power source that is on-board the UUV and is further operable, in response thereto, to control a recharge operation of the rechargeable power source based at least in part on the power source type.

27. A method of charging a power source in an unmanned underwater vehicle (UUV), comprising the steps of:
electrically coupling an electrical port to at least a portion of the UUV power source;
activating an electrical generator;
electrically coupling the electrical generator to the electrical port, to thereby charge the UUV power source using at least the electrical generator;
determining a state of charge of a battery; and
based at least in part on the determined state of charge, selectively activating the electrical generator and selectively electrically coupling the electrical generator to the battery, to thereby recharge the battery to a predetermined state of charge.

28. The method of claim 27, further comprising:
determining a docking status of the UUV.

29. The method of claim 27, further comprising:
transferring data from the UUV while charging the UUV power source.

30. The method of claim 27, wherein the UUV power source is one of a plurality of types of power sources, and wherein the method further comprises:
determining the type of rechargeable power source; and
charging the UUV power source based at least in part on its type.

31. A docking station for an unmanned underwater vehicle (UUV), comprising:
a housing;
a UUV docking port disposed within the housing and configured to dock a UUV therein;
an electrical port disposed at least partially within the UUV docking port, the electrical port adapted to electrically couple to a docked UUV;
a fluid-powered turbine adapted to receive a flow of fluid and configured, upon receipt thereof, to rotate;
a generator coupled to the turbine and configured, upon rotation thereof, to generate electrical power;
a sensor adapted to sense at least when a UUV is properly docked in the UUV docking port, and configured to supply a sensor signal representative thereof;
a UUV docking controller coupled to receive the signal from the sensor and operable, in response thereto, to supply a UUV docking signal that indicates at least that the electrical port is electrically coupled to the UUV; and
a controller coupled to receive the UUV docking signal and operable, in response thereto, to selectively electrically couple the generator to the electrical port.

32. A docking station for an unmanned underwater vehicle (UUV), comprising:
a housing;
a UUV docking port disposed within the housing and configured to dock a UUV therein;
an electrical port disposed at least partially within the UUV docking port, the electrical port adapted to electrically couple to a docked UUV;
a fluid-powered turbine adapted to receive a flow of fluid and configured, upon receipt thereof, to rotate;
a generator coupled to the turbine and configured, upon rotation thereof, to generate electrical power;
a sensor adapted to sense at least when a UUV is properly docked in the UUV docking port, and configured to supply a UUV docking signal representative thereof; and
a controller coupled to receive the UUV docking signal and operable, in response thereto, to selectively electrically couple the generator to the electrical port.

* * * * *